United States Patent
Kudo et al.

(10) Patent No.: US 9,099,101 B1
(45) Date of Patent: Aug. 4, 2015

(54) ACOUSTIC NOISE CONTROL FOR HARD DISK DRIVE

(71) Applicant: HGST Netherlands B.V., Amsterdam (NL)

(72) Inventors: Masaki Kudo, Tokyo (JP); Takahisa Takahashi, Kanagawa (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/276,740

(22) Filed: May 13, 2014

(51) Int. Cl.
*G11B 5/012* (2006.01)
*G11B 19/04* (2006.01)

(52) U.S. Cl.
CPC .............. *G11B 5/012* (2013.01); *G11B 19/042* (2013.01)

(58) Field of Classification Search
CPC .............. G11B 19/041; G11B 19/042; G11B 19/2018; G11B 5/012; G11B 33/08; G11B 3/61
USPC .............. 360/55, 97.19, 97.11, 97.12, 99.08; 720/651, 688, 695; 73/1.82
See application file for complete search history.

(56) References Cited

U.S. PATENT DOCUMENTS

| | | | |
|---|---|---|---|
| 5,903,408 A * | 5/1999 | Omi | 360/73.03 |
| 6,067,203 A * | 5/2000 | Ottesen et al. | 360/73.03 |
| 6,496,320 B1 * | 12/2002 | Liu | 360/75 |
| 6,633,448 B1 * | 10/2003 | Smith et al. | 360/69 |
| 7,221,532 B1 * | 5/2007 | Shukla | 360/75 |
| 8,184,389 B2 * | 5/2012 | Finamore et al. | 360/39 |
| 8,217,615 B2 * | 7/2012 | Tan et al. | 318/650 |
| 2003/0112538 A1 * | 6/2003 | Smith | 360/31 |
| 2007/0253089 A1 * | 11/2007 | Hayashi et al. | 360/73.03 |
| 2008/0130156 A1 * | 6/2008 | Chu et al. | 360/71 |

* cited by examiner

*Primary Examiner* — Thomas Alunkal
(74) *Attorney, Agent, or Firm* — Kunzler Law Group, PC

(57) ABSTRACT

Described herein is a method for controlling the acoustic noise generated by a spindle motor of a hard disk drive includes detecting vibrations of the hard disk drive, and distorting an input signal to the spindle motor based on the vibrations of the hard disk drive.

17 Claims, 4 Drawing Sheets

ACOUSTIC NOISE CONTROL FOR HARD DISK DRIVE

FIELD

This disclosure relates generally to electronic information storage apparatus, and more particularly to controlling the acoustic noise generated by spindle motors of hard disk drives.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a surface of magnetic material. A transducer head, e.g., read-write head, includes a writing component that magnetically polarizes areas or bits of the magnetic material with one or two polarities to encode either binary zeros or ones. Thus, data is recorded as magnetically encoded areas or bits of magnetic polarity. The direction of the magnetization points in different directions, which can be referred to as a positive state and a negative state. Each bit can store information (generally binary information in the form of either a 1 or a 0) according to the magnetic polarization state of the bit. Typically, bits are arranged along respective radially-adjacent (e.g., concentric) annular tracks of a disk. A single disk can include space for millions of tracks each with millions of bits. A transducer head also includes a reading component that detects the magnetic polarity of each bit or area and generates an electrical signal that approximates the magnetic polarity. The signal is processed to recover the binary data recorded on the magnetic material.

The disks of an HDD rotate as transducer heads hover over the respective disks to read data from and write data to the disks. Rotation of the disks is driven by a spindle motor that is rotatably coupled to the disks via a central spindle. During operation, the spindle motor may generate acoustic noise. Some attempts have been made to reduce the acoustic noise generated by a spindle motor. However, such attempts have various shortcomings.

SUMMARY

In view of the foregoing discussion, a need exists for an apparatus, system, and method for controlling the acoustic noise of a spindle motor of an HDD that overcomes the shortcomings of conventional techniques. For example, conventional techniques include testing a limited number of newly manufactured HDDs for a correlation between a spindle motor input signal waveform and spindle motor acoustic noise using dedicated testing equipment. The dedicated testing equipment may include an oscilloscope to measure the spindle motor input signal waveform and an acoustic sensor for directly sensing acoustic noise. Based on the results from testing the limited number of HDDs, the configuration of the tested HDDs and non-tested HDDs are adjusted in response to the results in an effort to reduce the acoustic noise generated by the spindle motors during operation.

However, every HDD and spindle motor is not configured exactly the same. The operating conditions (e.g., input signal characteristics) that produce acoustic noise for one spindle motor may not be the same for another spindle motor. Therefore, while an adjustment to the input signal characteristics of a tested HDD based individual testing of that HDD may be sufficient to control the acoustic noise generated by the spindle motor of that HDD, the same adjustment to an untested HDD may not be sufficient to control the acoustic noise generated by the untested HDD. Additionally, the operating conditions of a spindle motor that result in acoustic noise may change over time. Accordingly, initial adjustments to the input signal characteristics of a spindle motor that reduced acoustic noise at a given point in time, may not reduce acoustic noise at some later point in time.

Of course, each HDD can be individually tested using dedicated testing equipment (e.g., acoustic noise sensors) at the time of manufacturing or post-manufacturing, with corresponding adjustments made to the input signal characteristics. However, manually testing each HDD with dedicated testing equipment in this manner can be a time-consuming, complex, and delay-inducing process.

The subject matter of the present application has been developed in response to the present state of HDD art, and in particular, in response to problems and needs in the art, such as those discussed above, that have not yet been fully solved by currently available acoustic noise control techniques. For example, in some embodiments, the present disclosure has been developed to provide an apparatus, system, and method for automatically controlling the acoustic noise of a spindle motor of an HDD by utilizing a correlation between acoustic noise and mechanical vibration, and feedback control of an output signal from a vibration sensor of the HDD. In this manner, according to some embodiments, the present disclosure allows acoustic noise from a spindle motor to be controlled quickly, easily, and automatically, which overcomes the shortcomings of the prior art.

According to one embodiment, a method for controlling the acoustic noise generated by a spindle motor of a hard disk drive includes detecting vibrations of the hard disk drive, and distorting an input signal to the spindle motor based on the vibrations of the hard disk drive.

In some implementations, the method further includes comparing a magnitude of the vibrations to a threshold, and distorting the input signal to the spindle when the magnitude of the vibrations exceeds the threshold. The level of distortion of the input signal to the spindle is proportional to the difference between the magnitude of the vibrations and the threshold. The method may also include comparing a magnitude of the vibrations to the threshold after the input signal to the spindle is distorted. Additionally, the method may include further distorting the input signal to the spindle motor when the magnitude of the vibrations after the input signal to the spindle is distorted exceeds the threshold.

In some implementations, the method includes determining a condition of the spindle motor based on comparing the magnitude of the vibrations to the threshold. The magnitude of the vibrations can be repeatedly compared to the threshold and the input signal to the spindle can be repeatedly distorted when the magnitude of the vibrations exceeds the threshold. The method can include setting the condition of the spindle motor as a first condition if the magnitude of the vibrations does not exceed the threshold for any of the comparisons between the magnitude of the vibrations and the threshold before a predetermined number of comparisons between the magnitude of the vibrations and the threshold are performed, and setting the condition of the spindle motor as a second condition if the magnitude of the vibrations exceeds the threshold for each of the predetermined number of comparisons between the magnitude of the vibrations and the threshold.

In one implementation of the method, the input signal to the spindle is distorted based on frequency characteristics of the vibrations. In yet one implementation of the method, the input signal to the spindle is distorted based on a magnitude of the vibrations at a given frequency. According to another implementation, the input signal to the spindle motor is distorted in response to a command generated by a controller on-board the hard disk drive. The input signal to the spindle motor can be distorted in response to a command generated by a controller of a host computing device hosting the hard disk drive. In yet some implementations, the input signal to the spindle motor can be distorted in response to a command generated by a dedicated testing device.

According to certain implementations, distorting the input signal includes changing a frequency characteristic of the input signal and/or changing a waveform parameter of the input signal. The method may include positioning a slider of the hard disk drive in an unloaded position and spinning a spindle of the hard disk drive before detecting vibrations of the hard disk drive. Additionally, the method may include detecting vibrations of the hard disk drive using a vibration sensor of the hard disk drive.

In another embodiment, an apparatus for controlling the acoustic noise generated by a spindle motor of a hard disk drive includes a signal processing module, an analysis module, and a spindle motor drive module. The signal processing module can be configured to process an output signal from a vibration sensor. The analysis module can be configured to determine whether a magnitude of the processed output signal meets a threshold. The spindle motor drive module may be configured to distort an input signal to the spindle motor based on whether the magnitude of the processed output signal meets the threshold.

In some implementations of the apparatus, the spindle motor drive module repeatedly distorts the input signal while the magnitude of the processed output signal exceeds the threshold. Each distortion of the input signal includes changing at least one parameter of the input signal differently than other distortions of the input signal. The at least one parameter may include a frequency of the input signal.

According to yet another embodiment, a hard disk drive system includes at least one magnetic disk, a spindle to which the magnetic disks are coupled, a spindle motor operable to rotatably drive the spindle and the at least one magnetic disk, a vibration sensor configured to sense vibrations, a controller configured to generate an input signal for operation of the spindle motor, and a spindle motor signal distortion module configured to automatically command a distortion of the input signal in response to the vibrations sensed by the vibration sensor. The vibration sensor includes one of a rotational acceleration detection sensor or mechanical vibration detection sensor.

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
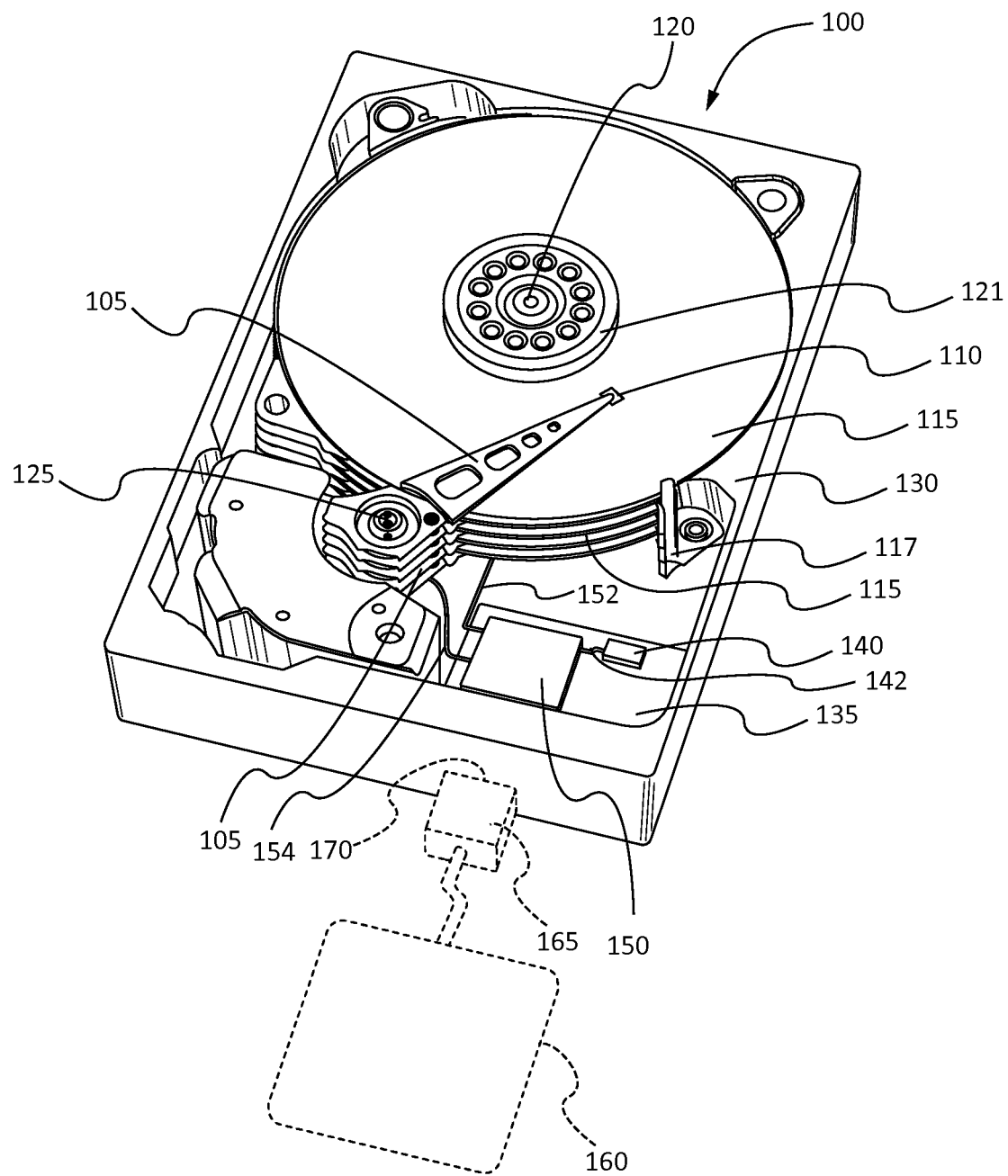
FIG. 1 is a perspective view of a magnetic storage device system according to one embodiment.

FIG. 1 is a perspective view of a magnetic storage device 100 according to one embodiment. The depicted magnetic storage device 100 is a hard disk drive (HDD), but other magnetic storage devices may be used. The HDD 100 includes armatures 105, transducer heads, such as transducer head 110, one or more disks 115, a spindle 120 driven by a spindle motor (not shown), a servo 125, and a base 130. The HDD 100 can also include a cover (shown removed) that couples to the base 130 to form an enclosed housing. Each transducer head 110 is secured to an end portion of a respective armature 105 (a second transducer head attached to lower armatures is not shown). Although the HDD 100 is shown having five armatures 105, one transducer head 110 per armature, five disks 115, one spindle 120, and one servo 125, any number of armatures, heads, disks, spindles, and servos may be employed.

The spindle 120 is operably connected to the base 130 via a spindle motor coupled to the base. The spindle 120 is co-rotatably coupled to the spindle motor such that the spindle motor rotatably drives the spindle. Accordingly, the spindle 120 can be considered to be part of or integral with the spindle motor. The disks 115 are operably connected to the spindle 120 via respective hubs 121 fixedly secured to respective disks and co-rotatably coupled to the spindle. In this manner, as the spindle 120 rotates, the disks 115 correspondingly rotate. Accordingly, the spindle motor can be operatively controlled to rotate the disks 115 a controlled amount and at a controlled rate. As the disks 115 rotate, the servo 125 positions the armatures 105 and the heads 110 connected to each armature, such that the heads are positioned over a specified radial area of the disks for read or write operations. In an idle mode, the servo 125 is controlled to position the armatures radially outwardly, as indicated by the directional arrow, such that each head is parked or unloaded onto a ramp support 117 secured to the base. Further, while in the idle mode, the spindle motor can be controlled to rotate the disks 115 at a desirable rate.

The HDD 100 also includes an electrical hardware board 135 mounted to the base 130. In this manner, the electrical hardware board 135 is on-board or contained within the HDD 100, as opposed to forming part of an electrical device external to or separate from the HDD. Generally, the electrical hardware board 135 includes hardware and/or circuitry used to control operation of the various components of the HDD 100. The electrical hardware board 135 may include a printed circuit board on or in which the hardware and/or circuitry is mounted. As shown, the electrical hardware board 135 includes at least a vibration sensor 140 and a controller 150. Although only the vibration sensor 140 and controller 150 are shown, the electrical hardware board 135 may include other components necessary for proper operation of the HDD 100.

The vibration sensor 140 can be any of various sensors for detecting mechanical vibrations. In one implementation, the vibration sensor 140 is a shock sensor. The shock sensor can be any of various types of shock sensors that transform physical force into electrical charge, such as piezoelectric elements and micro-electro-mechanical systems (MEMS). In another implementation, the vibration sensor 140 is a rotational vibration (RV) sensor. The RV sensor can be any of various types of RV sensors that transform physical force into electrical charge, such as piezoelectric elements and micro-electro-mechanical systems (MEMS). The vibration sensor 140 detects vibrations of the HDD 100 and generates an output signal that is communicated to other components of the HDD, such as the controller 150 via a communications conduit 142. Optionally, the output signal from the vibration sensor 140 can be communicated to components external to the HDD 100, such as an external controller 160, via a communications interface, such as a communications interface 170, of the HDD. The output signal includes data or information identifying characteristics (e.g., frequency and magnitude) of the vibrations detected by the vibration sensor 140. In one implementation, the output signal is an analog signal that is conditioned and converted to a digital signal by the controller 150, which can be considered an internal controller or a controller internal to the HDD housing. In yet another implementation, the vibration sensor 140 integrates signal conditioning and conversion functionality (e.g., logic and hardware) such that the output signal is a conditioned and converted digital signal.

The controller 150 includes logic and hardware for controlling the operations of the HDD 100. For example, the controller 150 may generate and send (e.g., via communications conduit 152) input signals to the spindle motor for controlling operation of the spindle motor. Additionally, the controller 150 may generate and send (e.g., via communications conduit 154) input signals to the servo 125 for controlling operation of the spindle motor. Generally, each input signal is an electric current defined by controllable characteristics, such as waveform, frequency, magnitude, etc. The components of the HDD 100 may respond differently to input signals with different characteristics. In other words, by modifying the characteristics of an input signal, the behavior or operation of the component can be modified. In some implementations, the controller 150 generates the input signals based on data or requests received from other components of the HDD 100, or optionally from components external to the HDD 100, such as the external controller 160, via a communications interface, such as the communications interface 170, of the HDD.

The external controller 160 can include logic and/or hardware for directly or indirectly controlling operations of the HDD 100. For example, in some implementations, the external controller 160 may directly control the spindle motor by generating and communicating input signals directly to the spindle motor of the HDD, thus effectively bypassing the controller 150 on the HDD 100. In yet certain implementations, the external controller 160 merely indirectly controls the spindle motor by requesting or commanding the controller 150 to generate input signals with requested characteristics. The external controller 160 can form part of a host computing device that is hosting the hard disk drive 100. For example, the external controller 160 may be part of the logic and hardware of a laptop or desktop computer that is using the HDD 100 for storing and retrieving digital information. Alternatively, the external controller 160 may form part of a dedicated testing device that communicates with the controller 150 via the communications interface 170 and a communications line 165 communicatively engaged with (e.g., plugged into) the interface. The dedicated testing device may be used to test an HDD during the manufacturing of the HDD, such as before the HDD is provided to end users.

Figure 2:
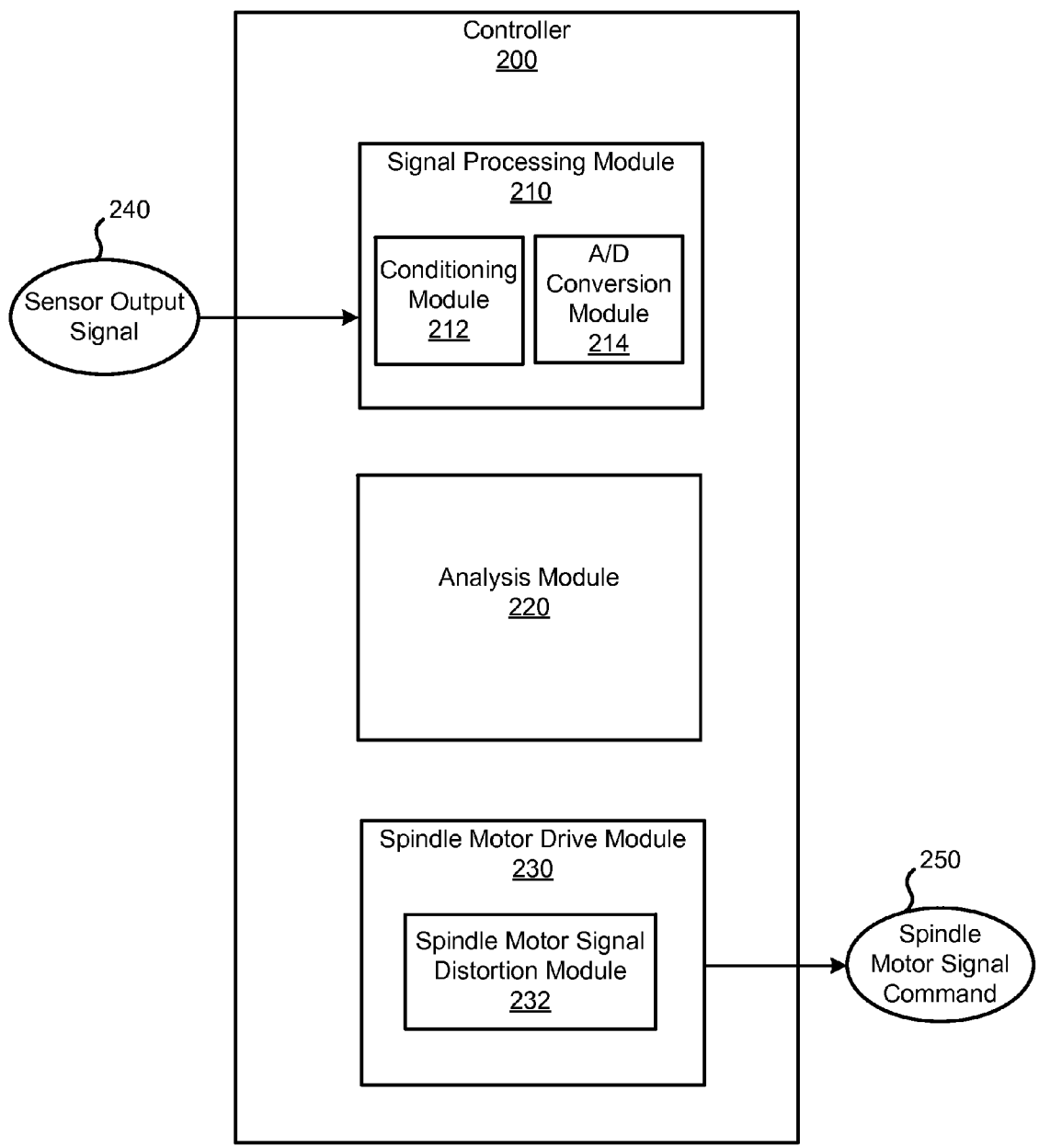
FIG. 2 is a schematic block diagram of a controller for controlling the acoustic noise of a spindle motor of a magnetic storage device according to one embodiment.

Referring to FIG. 2, according to one embodiment, a controller 200 includes a signal processing module 210, an analysis module 220, and a spindle motor drive module 230. The controller 200 can be or form part of the controller 150 of the HDD 100 in some implementations. In yet certain implementations, the controller 200 can be or form part of the external controller 160. Generally, in some implementations, the controller 200 is configured to automatically control the acoustic noise of a spindle motor of an HDD by utilizing feedback control of an output signal from a vibration sensor of the HDD. For example, the controller 200 receives a sensor output signal 240 and generates a spindle motor signal command 250 based at least partially on the sensor input signal 240. The spindle motor signal command 250 may then be converted into a spindle motor signal sent to the spindle motor for controlling operation of the spindle motor.

Figure 3:
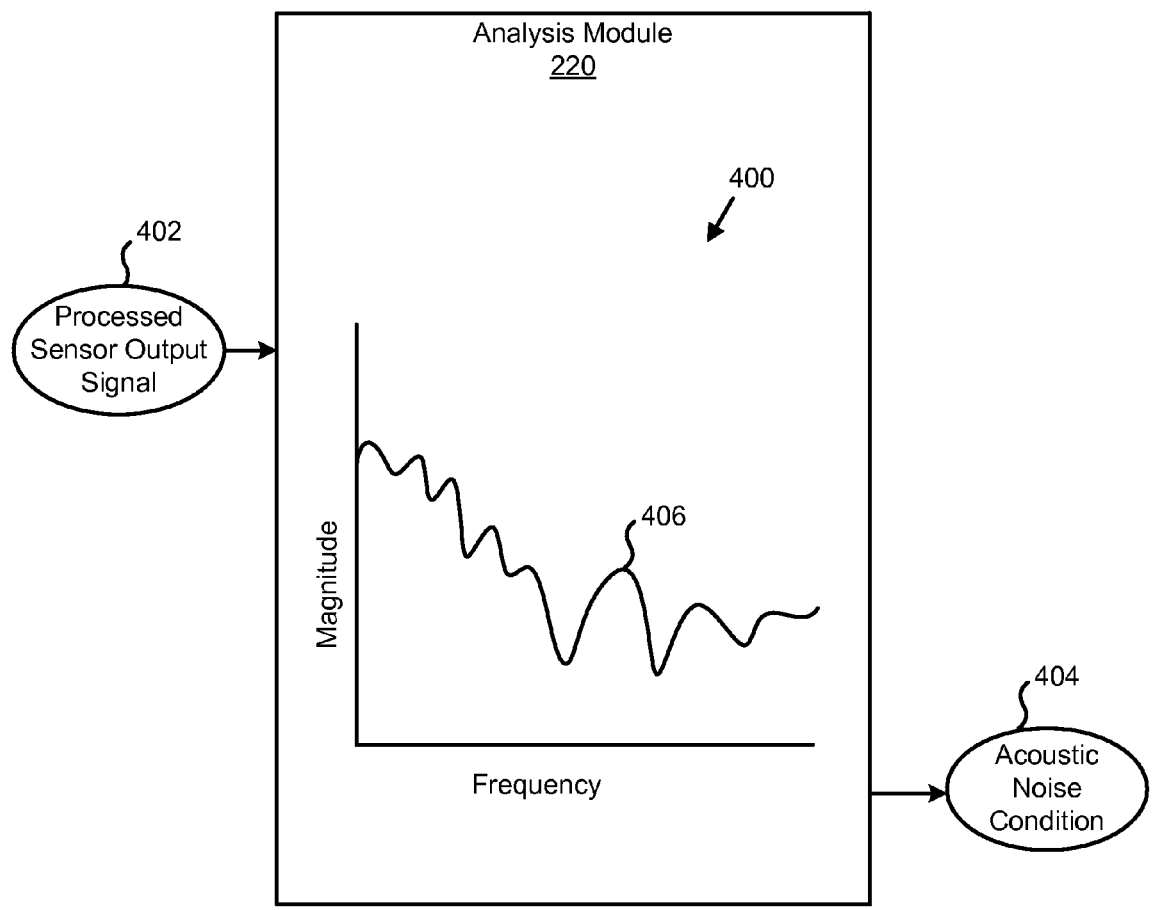
FIG. 3 is a schematic block diagram of an analysis module of the controller of FIG. 2 according to one embodiment.

The signal processing module 210 includes a conditioning module 212 and an analog-to-digital (A/D) conversion module 214. The conditioning module 212 is configured to condition the sensor output signal 240, which is received from the vibration sensor 140. In some implementations, the conditioning module 212 includes a gain circuit or amplifier that increases the power or amplitude of the sensor output signal 240. The A/D conversion module 214 converts the sensor output signal 240 from an analog signal to a digital signal. Accordingly, the A/D conversion module 214 may include an A/D converter device (e.g., integrated circuit) that converts a physical characteristic (e.g., voltage) of the sensor output signal 240 to a digital number that represents the physical characteristic (e.g., amplitude and/or frequency). The output of the signal processing module 210 is a processed sensor output signal 402, which as shown in FIG. 3, is communicated to or utilized by the analysis module 220 of the controller 200.

The analysis module 220 is configured to determine an acoustic noise condition 404 of the spindle motor of the HDD 100 based on the processed sensor output signal 402. In the illustrated embodiment, the analysis module 220 charts or stores characteristics of the processed sensor output signal 402. For example, as shown in FIG. 3, the analysis module 220 includes a chart 400 that compares the magnitude and frequency characteristics of the processed sensor output signal 402 following a Fast Fourier Transform (FFT) of the processed sensor output signal. More specifically, the analysis module 220 includes logic and/or hardware that determine an FFT pattern 406 of the processed sensor output signal 402. The FFT pattern 406 tracked by the chart 400 provides the averaged magnitude or amplitude for each frequency of the processed sensor output signal 402. Accordingly, the chart 400 is useful for providing the magnitude of the processed sensor output signal 402 at a given or targeted frequency.

The present disclosure recognizes a correlation between mechanical vibration of an HDD and acoustic noise generated by a spindle motor of that HDD. Based on this recognized correlation, an estimate of the acoustic noise generated by a spindle motor can be determined based on the mechanical vibrations detected by a vibration sensor. Accordingly, in one implementation, the analysis module 220 estimates the acoustic noise generated by the spindle motor of the HDD 100 as a function of the processed sensor output signal 402. More specifically, for a given frequency, the analysis module 220 estimates the acoustic noise generated by the spindle motor to be proportional to the magnitude of the processed sensor output signal 402 at that frequency. For example, the higher the magnitude of the processed sensor output signal 402, the higher the acoustic noise generated by the spindle motor. In one implementation, the acoustic noise is estimated to be the magnitude of the processed sensor output signal 402 multiplied by a factor that can be adjusted by the controller 150.

The acoustic noise condition 404 can be an indicator representing the estimated level of acoustic noise being generated by the spindle motor during operation of the spindle motor. In some implementations, the acoustic noise condition 404 is the quantity of acoustic noise generated by the spindle motor expressed in terms of units of sound (e.g., decibels). In other implementations, the acoustic noise condition 404 may be expressed in terms of quantity statuses, such as high or low. Alternatively, the acoustic noise condition 404 may be an indicator representing the magnitude of the processed sensor output signal 402 at a given frequency as determined from the chart 400. For example, in one implementation, the acoustic noise condition 404 can be the difference between the magnitude of the processed output sensor signal 402 and a threshold magnitude. Further, in yet some implementations, the acoustic noise condition 404 may be an indicator representing whether a threshold associated with acoustic noise of the spindle motor has been met. The threshold can be a threshold of the detected magnitude of the processed sensor output signal 402 at a targeted frequency. In some implementations, the threshold can be a threshold of the estimated magnitude of the acoustic noise generated by the spindle motor based on the processed sensor output signal 402.

Referring back to FIG. 2, the spindle motor drive module 230 is configured to generate a spindle motor signal command 250 based on the acoustic noise condition 404. The spindle motor drive module 230 includes a spindle motor signal distortion module 232. Generally, the spindle motor signal distortion module 232 is configured to determine desirable characteristics or parameters for the spindle motor input signal based on the acoustic noise condition 404. In some implementations, the spindle motor signal command 250 requests the controller 150 of the HDD 100 to generate a spindle motor input signal that has the desirable characteristics. The desirable characteristics for the spindle motor input signal are based on the acoustic noise condition 404. For example, if the acoustic noise condition 404 indicates an undesirable level of acoustic noise from the spindle motor, the desirable characteristics may be different than the characteristics of the spindle motor input signal previously being generated by the controller 150 and sent to the spindle motor. In this manner, the request for an input signal with the desirable characteristics represents a request to distort the spindle motor input signal previously sent or actively being sent to the spindle motor. The desirable characteristics can represent a change in any of various characteristics, such as frequency, waveform, amplitude, and the like, of the spindle motor input signal that when implemented by the spindle motor will reduce the acoustic noise being generated by the spindle motor. The level or degree of distortion of the spindle motor input signal may be proportional to the difference between the magnitude of the processed output sensor signal 402 and a threshold magnitude.

Figure 4:
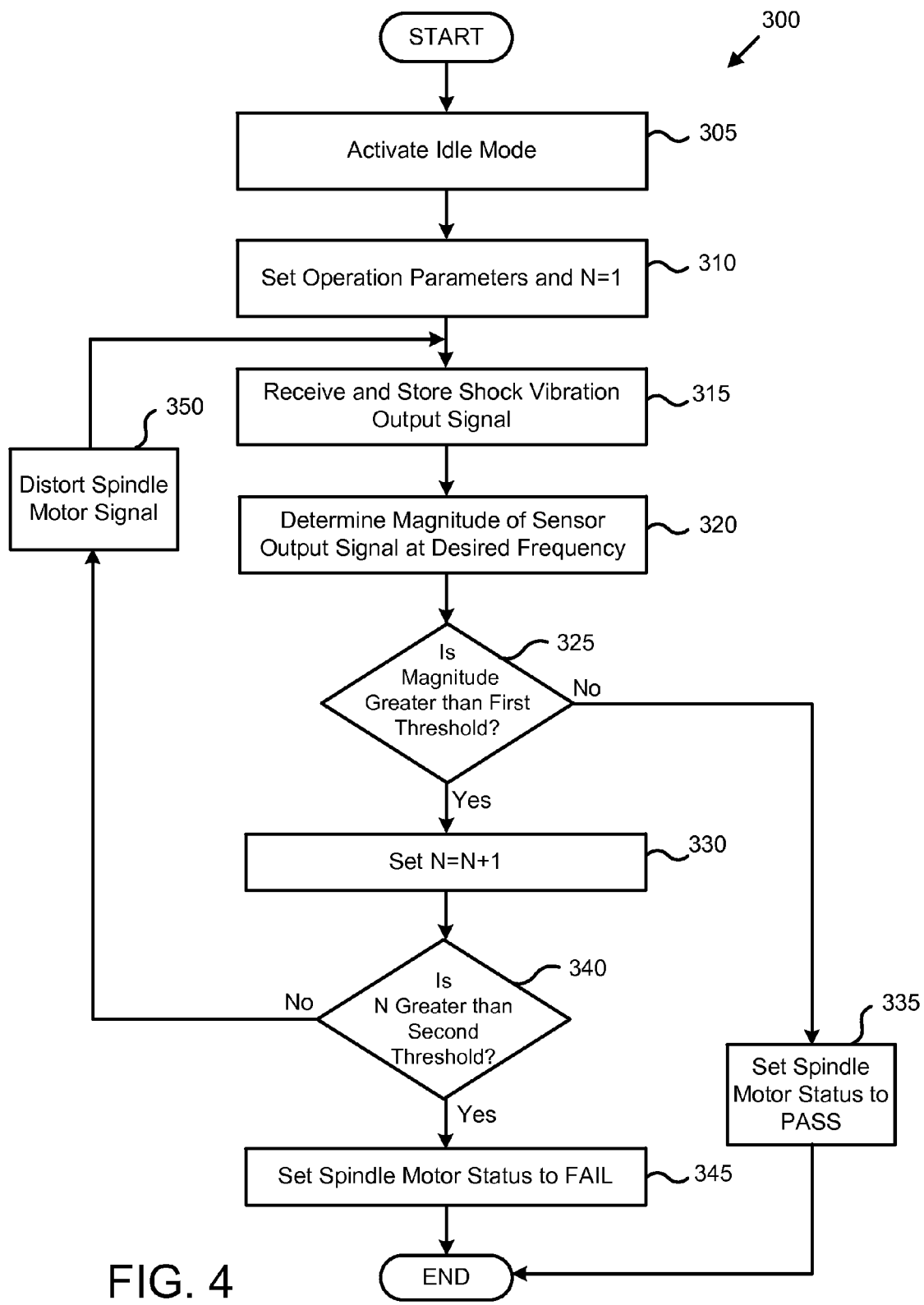
FIG. 4 is a schematic flow chart diagram of one embodiment of a method for controlling the acoustic noise of a spindle motor of a magnetic storage device.

According to one embodiment, a method 300 for automatically controlling the acoustic noise of a spindle motor of an HDD by utilizing feedback control of an output signal from a vibration sensor of the HDD is shown in FIG. 4. The steps of the method 300 can be executed by one or more of the modules of the controller 200 described above. The method 300 includes activating an idle mode of an HDD at 305. In one implementation, the idle mode includes spinning the disks of the HDD via operation of a spindle motor, and parking the transducer head. Further, although not shown, the method 300 may be executed only when the HDD is in a quiet or relatively vibration-free environment for a predetermined amount of time necessary to execute the method. The method 300 then sets at 310 operating parameters or characteristics of the spindle motor input signal and sends the signal to the spindle motor. In one implementation, the characteristics of the spindle motor input signal are set at 310 according to predetermined factory or standard settings. Additionally, at 310, the method 300 includes setting a counter value N to 1.

The method 300 further includes receiving and storing vibration sensor output signals at 315. The vibration sensor output signals may be received from a vibration sensor, and may be processed prior to storing the signals. Additionally, the method 300 includes determining a magnitude of the vibration sensor output signal at a desired frequency at 320. The desired or targeted frequency can be any of various frequencies, such as the frequency associated with the pure tone component of the spindle motor. The method 300 determines at 325 whether the magnitude of the vibration sensor output signal at the desired frequency meets (e.g., is greater than) a threshold magnitude. The desired frequency and threshold magnitude are determined can be determined based on acoustic noise preferences supplied from or determined by customers. If the magnitude of the vibration sensor output signal at the desired frequency meets the threshold magnitude as determined at 325, then the method 300 sets the counter value N equal to N+1 at 330. However, if the magnitude of the vibration sensor output signal at the desired frequency does not meet (e.g., is less than) the threshold magnitude as determined at 325, then the method 300 sets a spindle motor status to PASS, or other similar condition indicator, at 335 and the method ends. Basically, because the acoustic noise of the spindle motor can be correlated to mechanical vibrations of the HDD, if the magnitude of mechanical vibrations is lower than a threshold value, which is correlated to a maximum allowable level of acoustic noise, then the motor spindle is producing acceptable levels of acoustic noise and passes the status check.

After the counter value N is set to N+1 at 330, the method 300 determines whether the counter value N meets (e.g., is greater than) a second or cycle threshold at 340. The cycle threshold is associated with the maximum number of chances allowed to reduce the acoustic noise of the spindle motor below acceptable levels before the spindle motor fails the status check. For example, if the counter value N is greater than the cycle threshold at 340, then the method 300 sets the spindle motor status to FAIL, or other similar condition indicator, at 345. However, if the counter value N is less than the cycle threshold at 340, then the spindle motor is given at least one more chance at reducing the acoustic noise by distorting the spindle motor input signal at 350. Distortion of the spindle motor input signal at 350 may include adjusting characteristics of input signal that may affect the acoustic noise generated by the spindle motor. The distorted spindle motor input signal is then sent to the spindle motor to adjust the operating characteristics of the spindle motor. The method 300 then proceeds to reevaluate the condition of the spindle motor (e.g., initiate another cycle of the analysis steps of 315-325 of the method 300) while operating under the newly distorted input signal.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Also, securing one element to another element can include direct and indirect securing. Additionally, as used herein, "adjacent" does not necessarily denote contact (i.e., one element can be adjacent to another without being in contact with the other).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method of testing a spindle motor of a hard disk drive, the method comprising:
    activating an idle mode of the hard disk drive;
    with the hard disk drive in the idle mode:
        detecting vibrations of the hard disk drive using an output signal from a vibration sensor coupled to the hard disk drive;
        distorting an input signal to the spindle motor based on the vibrations of the hard disk drive; and
        comparing a magnitude of the vibrations at a targeted frequency of the vibrations to a threshold, the magnitude of the vibrations at the targeted frequency of the vibrations being determined via a Fourier transform of the output signal from the vibration sensor, wherein the input signal to the spindle motor is distorted when the magnitude of the vibrations at the targeted frequency exceeds the threshold, and wherein the magnitude of the vibrations at the targeted frequency is repeatedly compared to the threshold and the input signal to the spindle motor is repeatedly distorted when the magnitude of the vibrations at the targeted frequency exceeds the threshold;
    determining a condition of the spindle motor based on comparing the magnitude of the vibrations at the targeted frequency to the threshold; and
    setting the condition of the spindle motor as a first condition indicating non-failure of the spindle motor if the magnitude of the vibrations at the targeted frequency does not exceed the threshold for any of the comparisons between the magnitude of the vibrations at the targeted frequency and the threshold before a predetermined number of comparisons between the magnitude of the vibrations at the targeted frequency and the threshold are performed; and setting the condition of the spindle motor as a second condition indicating failure of the spindle motor if the magnitude of the vibrations at the targeted frequency exceeds the threshold for each of the predetermined number of comparisons between the magnitude of the vibrations at the targeted frequency and the threshold.

2. The method of claim 1, wherein the level of distortion of the input signal to the spindle motor is proportional to the difference between the magnitude of the vibrations and the threshold.

3. The method of claim 1, further comprising: comparing a magnitude of the vibrations at the targeted frequency of vibrations to the threshold after the input signal to the spindle motor is distorted; and further distorting the input signal to the spindle motor when the magnitude of the vibrations at the targeted frequency of vibrations after the input signal to the spindle motor is distorted exceeds the threshold.

4. The method of claim 1, wherein the input signal to the spindle motor is distorted based on frequency characteristics of the vibrations.

5. The method of claim 1, wherein the input signal to the spindle motor is distorted based on a magnitude of the vibrations at a given frequency.

6. The method of claim 1, wherein the input signal to the spindle motor is distorted in response to a command generated by a controller on-board the hard disk drive.

7. The method of claim 1, wherein the input signal to the spindle motor is distorted in response to a command generated by a controller of a host computing device hosting the hard disk drive.

8. The method of claim 1, wherein the input signal to the spindle motor is distorted in response to a command generated by a dedicated testing device.

9. The method of claim 1, wherein distorting the input signal comprises changing a frequency characteristic of the input signal.

10. The method of claim 1, wherein distorting the input signal comprises changing a waveform parameter of the input signal.

11. The method of claim 1, further comprising positioning a slider of the hard disk drive in an unloaded position and spinning a spindle of the hard disk drive before detecting vibrations of the hard disk drive.

12. The method of claim 1, further comprising detecting vibrations of the hard disk drive using a vibration sensor of the hard disk drive.

13. An apparatus for testing a spindle motor of a hard disk drive, the apparatus comprising:
   a controller that activates an idle mode of the hard disk drive to test the spindle motor;
   a signal processing module configured to process an output signal from a vibration sensor while the hard disk drive is in the idle mode;
   an analysis module configured to determine whether a magnitude of the processed output signal at a targeted frequency meets a threshold while the hard disk drive is in the idle mode; and
   a spindle motor drive module configured to distort an input signal to the spindle motor while the hard disk drive is in the idle mode based on whether the magnitude of the processed output signal at the targeted frequency meets the threshold, wherein while the hard disk drive is in the idle mode the spindle motor drive module repeatedly distorts the input signal while the magnitude of the processed output signal at the targeted frequency exceeds the threshold;
   wherein the analysis module determines a condition of the spindle motor based on whether the magnitude of the processed output signal at the targeted frequency meets the threshold; and
   wherein the analysis module sets the condition of the spindle motor as a first condition indicating non-failure of the spindle motor if the magnitude of the processed output signal at the targeted frequency does not exceed the threshold for any comparisons between the magnitude of the processed output signal at the targeted frequency and the threshold before a predetermined number of comparisons between the magnitude of the processed output signal at the targeted frequency and the threshold are performed, and the condition of the spindle motor as a second condition indicating failure of the spindle motor if the magnitude of the processed output signal at the targeted frequency exceeds the threshold for each of the predetermined number of comparisons between the magnitude of the processed output signal at the targeted frequency and the threshold.

14. The apparatus of claim 13, wherein each distortion of the input signal comprises changing at least one parameter of the input signal differently than other distortions of the input signal.

15. The apparatus of claim 14, wherein the at least one parameter comprises a frequency of the input signal.

16. A hard disk drive system, comprising:
   at least one magnetic disk;
   a spindle to which the at least one magnetic disk is coupled;
   a spindle motor operable to rotatably drive the spindle and the at least one magnetic disk;
   a vibration sensor configured to sense vibrations of the hard disk drive;
   a controller configured to generate an input signal for operation of the spindle motor, the controller further configured to activate an idle mode of the hard disk drive to test the spindle motor; and
   a spindle motor signal distortion module configured to automatically command a distortion of the input signal in response to the vibrations sensed by the vibration sensor meeting a threshold while the hard disk drive is in the idle mode;
   wherein the controller is further configured to determine a condition of the spindle motor based on comparisons between the vibrations and the threshold, the vibrations sensed while the hard disk drive is in the idle mode, to set the condition of the spindle motor as a first condition indicating non-failure of the spindle motor if the vibrations do not exceed the threshold for any of the comparisons between the vibrations and the threshold before a predetermined number of comparisons between the vibrations and the threshold are performed, and to set the condition of the spindle motor as a second condition indicating failure of the spindle motor if the vibrations exceed the threshold for each of the predetermined number of comparisons between the vibrations and the threshold.

17. The hard disk drive system of claim 16, wherein the vibration sensor comprises one of a rotational acceleration detection sensor or a mechanical vibration detection sensor.

* * * * *

UNITED STATES PATENT AND TRADEMARK OFFICE
CERTIFICATE OF CORRECTION

| | | |
|---|---|---|
| PATENT NO. | : 9,099,101 B1 | Page 1 of 1 |
| APPLICATION NO. | : 14/276740 | |
| DATED | : August 4, 2015 | |
| INVENTOR(S) | : Masaki Kudo et al. | |

It is certified that error appears in the above-identified patent and that said Letters Patent is hereby corrected as shown below:

In the specification,

Column 8, Line 56
  "The desired frequency and threshold magnitude are determined can be determined based on"---should read "The desired frequency and threshold magnitude can be determined based on"

Signed and Sealed this
Third Day of May, 2016

Michelle K. Lee
*Director of the United States Patent and Trademark Office*